Figure 1:
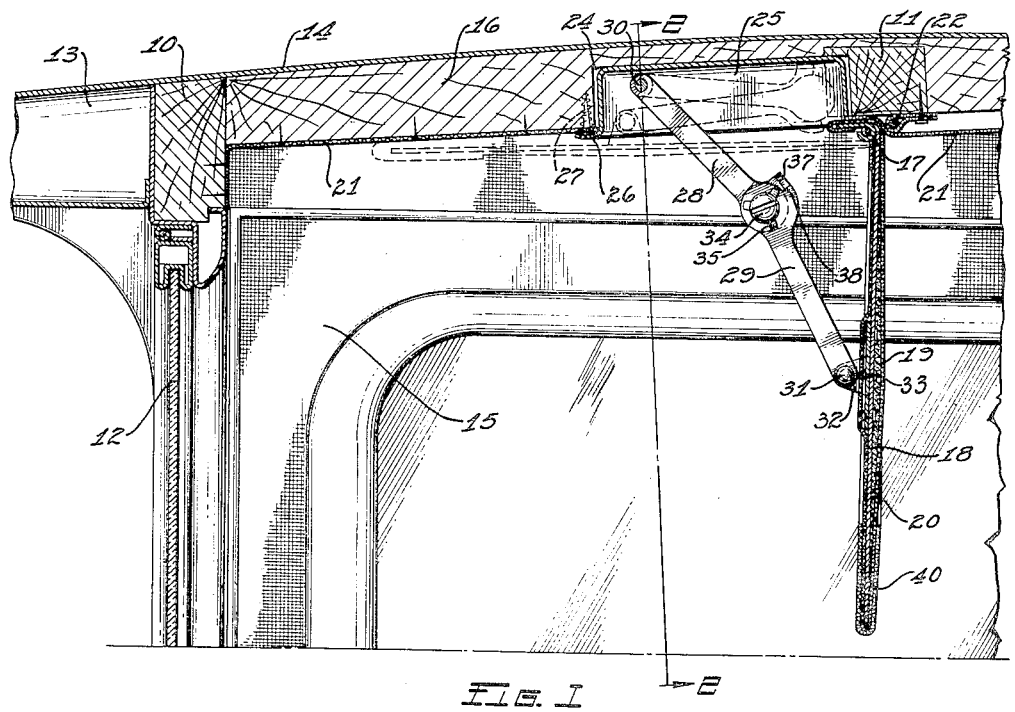

Sept. 5, 1933.    J. G. VINCENT    1,925,123
MOTOR VEHICLE
Filed Oct. 16, 1929

Inventor
JESSE G. VINCENT.

Patented Sept. 5, 1933

1,925,123

UNITED STATES PATENT OFFICE 1,925,123

MOTOR VEHICLE

Jesse G. Vincent, Detroit, Mich., assignor to Packard Motor Car Company, Detroit, Mich., a corporation of Michigan Application October 16, 1929. Serial No. 399,947

6 Claims. (Cl. 296—97)

This invention relates to motor vehicles, and more particularly to visors.

It is customary to equip motor vehicle bodies with an exterior visor arranged to extend downwardly at an angle in advance of the windshield for the purpose of shielding the occupants of the vehicle from light beams. The angle and position of such structures must be such as to allow the driver a good vision of the road, and they cease to be useful when light beams project in a plane with or at a small angle to the plane of the body. Visors of this character are therefore useless when the vehicle is in an angular plane approximating that of a beam of light, when the sun is low in the horizon, and for shielding the driver from the light beams of a vehicle approaching at night. There have been adjustable exterior visors which obviate to some extent the difficulties mentioned, but in order to make such adjustments it is necessary for the driver to stop the vehicle, and therefore they have never been popular. In addition to the above mentioned objections, exterior visors offer some resistance to the progress of the vehicle, narrow the field of vision through the windshield, and prevent observation of elevated stop lights located centrally at street crossings.

An object of the invention is to provide an interior visor for a motor vehicle which is arranged so that the above mentioned objections are substantially eliminated.

Another object of my invention is to provide an interior visor for motor vehicles which can be placed in a position substantially flush with the body head lining when not in use.

A further object of the invention is to provide an interior visor for motor vehicles which can be readily adjusted by the driver without interfering in any way with his control of the vehicle.

Still another object of the invention is to provide a visor for motor vehicles which can be pushed or pulled into a desired angular position by the driver and which will automatically remain in the position into which it is moved.

Another object of the invention is to provide a short length interior visor for motor vehicles which can be readily adjusted to shield the driver's eyes from light beams projecting through the windshield at substantially any angle relative to the plane of the vehicle.

Figure 2:
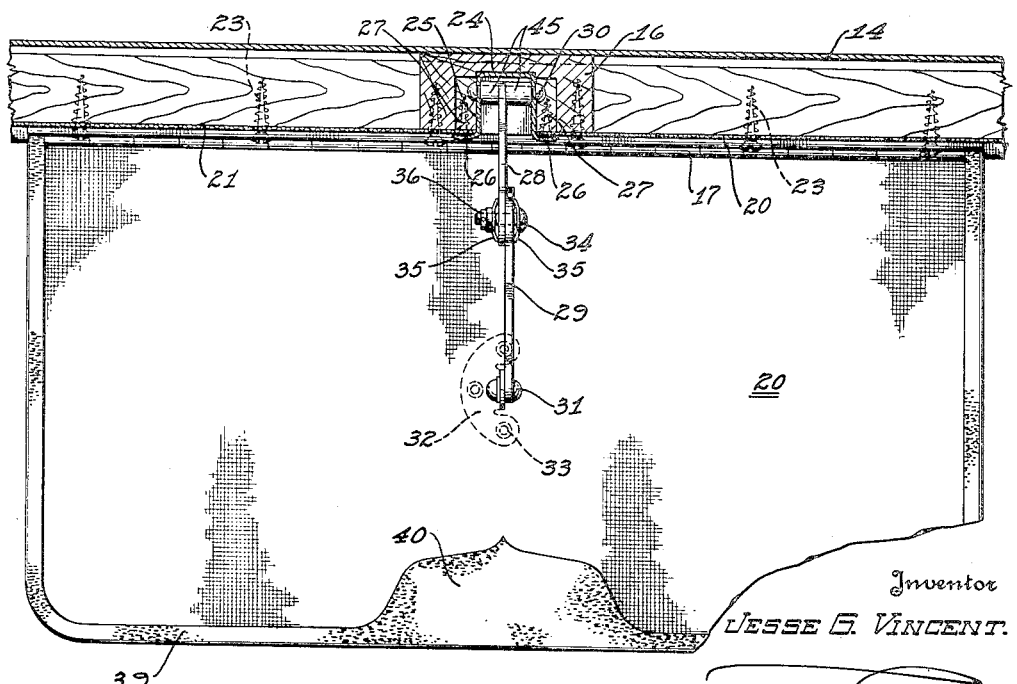

These and other objects of the invention will appear from the following description taken in connection with the drawing, which forms a part of this specification, and in which:

Fig. 1 is a vertical sectional view of the upper front portion of a motor vehicle body having my invention associated therewith, Fig. 2 is a sectional view of the same taken on line 2—2 of Fig. 1.

In the drawing, 10 designates the front header bar of the vehicle roof frame and parallel therewith is arranged another roof cross bar 11. The windshield 12 is arranged in a vertical plane with the front header bar and is secured in a conventional manner. The roof frame also includes a section 13 which extends forwardly from the header bar, and a top cover 14 is secured upon the roof frame. One of the side front doors is indicated at 15.

Arranged interiorly of the vehicle body and secured to the roof thereof, I arrange one or more visor structures for shielding the driver and the other occupant of the seat directly behind the windshield. In order to support the visor structure, I provide a longitudinal runner member 16 which is grooved to fit over the cross bar 11 and is secured at its forward end to the header bar 10. A hinge 17 is secured beneath and adjacent the forward edge of the cross bar 11, and carries a plate 18 which forms the body of the visor proper. The hinge is preferably of the "piano" type, and the plate or visor body 18 is substantially rectangular in form and of a short width, sufficient however to shield the eyes of the driver. A padding 19 is arranged on the under side of the plate and a cover 20, preferably made of the same material as the roof head lining 21, incloses the plate and extends over the lower side of the hinge so that it completely conceals the same from the occupants of the vehicle. The cover 20 is preferably first applied and secured around the plate 18 and one side of the hinge prior to the attachment of the hinge to the cross bar 11.

The head lining 21, which is preferably of some cloth material, covers the under surface of the roof and the rear portion thereof is spaced by means of cord welts, indicated at 22, which are arranged transversely of the roof. One of such welts is secured to the cross bar 11 adjacent the hinge 17 and a portion of the lining extending forwardly of the front welt is secured directly to the under surface of the roof frame. The welt is similar in size to the hinge 17 and the hinge is secured to the cross bar 11 against the lining 21 by means of screws 23. The hinge is also secured so that the free end of the visor swings adjacent the windshield, and when the visor is pushed against the roof, it will be substantially flush with the general line of the head lining.

As the covering of the visor is the same as that of the head lining and in a plane substantially flush with the lining when folded, the ceiling of the body will present substantially an unbroken surface of similar material, so that the neat appearance of the body ceiling will not be detracted from by the addition of one or more interior visors.

If desired, the "piano" hinge can be formed so that it operates with friction sufficient to maintain the visor in any position of its range of movement in which it is placed, however, I have illustrated separate mechanism for performing this retaining function. To this end I provide a recess 24 formed in the longitudinally extending runner 16 and a front portion of the cross bar 11, preferably in a position which will be central of the area in which the visor is desired to be positioned. The casing 25 is inserted into the recess 24 and is provided with oppositely extending flanges 26 which are secured against the undersurface of the runner 16 by the screws 27. Link mechanism is associated intermediate the casing 25 and the visor which consists of a pair of link members 28 and 29. The link member 28 is pivotally mounted at one end upon a pin 30 which extends transversely through and is secured to the casing 25 adjacent the forward upper end thereof, spacers 45 positioning the link in the casing. One end of the link 29 is pivotally mounted upon a pin 31 which is secured to a bracket 32 projecting through the cover 20 and secured to the plate by rivets 33. A screw 34 extends through the adjacent ends of the links 28 and 29 and spring tension members 35 being arranged on the screws and against the remote sides of the adjacent links. The nut 36 is threaded upon the screw member to retain the links and tension members in position and to exert a desired pressure against the spring members. The link 28 is provided with an arm 37 which engages with an abutment 38 on the link 29 to limit the movement of the visor in a direction away from the roof.

The edges of the visor cover 20 are bound by a suitable trim 39, a central portion 40 of which provides a grip for the driver so that the cover 20 will not get soiled.

It will be seen that the arm members 28 and 29 will be moved toward a parallel relation and into the casing 25 as the visor is pushed into a position against the head lining so that such visor retaining mechanism will fold into the casing as the angle of the visor relative to the roof is reduced. The tension of the elements 35 is sufficient to maintain the visor links frictionally in any adjusted position and still permit the visor to be easily pushed or pulled into a desired position. The driver of the motor vehicle can grasp the visor with one hand and readily move it upwardly or downwardly into an angular position such that beams of light projecting at an angle to the plane of the body will not be visible, and furthermore the forwardly folding action of the visor is such that it will normally reside in a plane enough in advance of the driver's head so that there is no inconvenience therefrom.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

What I claim is:

1. In a motor vehicle, the combination with a body roof and a head lining having a rear portion spaced from the roof, of a visor structure comprising a plate, a hinge securing one edge of the plate to the roof in a plane flush with the spaced head lining, and a cover of upholstery material for the plate concealing the hinge.

2. In a motor vehicle the combination with a recessed body roof having a head lining, of an adjustable interior visor for obscuring the advanced vision of the occupants of the vehicle, a piano hinge for hingedly fastening the visor directly to the roof, and arms hingedly connected to the visor and to the roof within the recess and provided with friction members for frictionally holding the visor in any desired position, the hinged arms being disposed to disappear within the recess to permit the visor to be placed, in its inoperative position, in a plane substantially flush with the head lining.

3. In a motor vehicle the combination with a closed body roof structure including a roof cross-bar and a head lining, of a visor plate arranged at its upper edge to constitute one leaf of a hinge, another hinge leaf secured to the roof cross-bar, a cover for the plate, of a material similar to the head lining, extending over the bottom and top edges of the plate and over the hinge leaf secured to the roof cross-bar, and a cord welt secured to the roof cross-bar with its thick portion adjacent the hinge.

4. In a motor vehicle, the combination with a body roof and a head lining having a rear portion spaced from the roof, of a visor structure comprising a plate, a hinge securing one edge of the plate to the roof in a plane flush with the spaced head lining, and a cover of upholstery material for the plate.

5. In a motor vehicle, the combination with a body roof structure including a cross-rib and a head lining, of an opaque visor plate swingable from a position flat against the head lining to a vertical position, the rear edge of said plate constituting one leaf of a hinge, and a hinge leaf section secured lengthwise of the cross-rib, said hinge leaves being frictionally associated and so that the leaf portion of the hinge section is at all times obscured by the plate from the vision of the occupants of the vehicle.

6. In a motor vehicle, the combination with a body roof structure including a roof cross-rib and a head lining, of a visor plate formed along its rear edge to constitute one leaf of a hinge, another hinge leaf secured lengthwise of the roof cross-rib, and a cover for the plate of a material similar to the head lining, said cover extending around the plate and over the leaf hinge secured to the roof cross-rib.

JESSE G. VINCENT.